United States Patent
Tran

(10) Patent No.: US 11,188,478 B1
(45) Date of Patent: Nov. 30, 2021

(54) APPARATUS AND METHOD FOR USING INSTRUCTION TRANSLATION LOOK-ASIDE BUFFERS IN THE BRANCH TARGET BUFFER

(71) Applicant: ANDES TECHNOLOGY CORPORATION, Hsinchu (TW)

(72) Inventor: Thang Minh Tran, Saratoga, CA (US)

(73) Assignee: ANDES TECHNOLOGY CORPORATION, Hsinchu (TW)

(*) Notice: Subject to any disclaimer, the term of this patent is extended or adjusted under 35 U.S.C. 154(b) by 0 days.

(21) Appl. No.: 16/888,873

(22) Filed: Jun. 1, 2020

(51) Int. Cl.
 *G06F 12/10* (2016.01)
 *G06F 12/1027* (2016.01)

(52) U.S. Cl.
 CPC ...... *G06F 12/1027* (2013.01); *G06F 2212/68* (2013.01)

(58) Field of Classification Search
 CPC .................. G06F 12/1027; G06F 2212/68
 USPC ............................................. 711/205
 See application file for complete search history.

(56) References Cited

U.S. PATENT DOCUMENTS

| 8,667,258 | B2* | 3/2014 | Prasky | G06F 9/3806 |
| | | | | 712/238 |
| 2020/0081717 | A1* | 3/2020 | Orion | G06F 9/3848 |
| 2021/0089472 | A1* | 3/2021 | Ishii | G06F 12/121 |

* cited by examiner

*Primary Examiner* — Hua J Song
(74) *Attorney, Agent, or Firm* — JCIPRNET

(57) ABSTRACT

A microprocessor includes a translation look-aside buffer (TLB) having a plurality of TLB entries addressable by a branch address and having a branch target buffer (BTB), including a plurality of BTB entries addressable by the branch address. Each TLB entry includes a virtual address. Each BTB entry including a branch tag-way data and a target tag-way data. To perform a branch prediction, the BTB and TLB are accessed, where the TLB way associative data representing one of N sets of TLB entries is used to determine BTB hit or BTB miss. If BTB hit, the branch target address of the branch address may be obtained by accessing the TLB using target tag-way data in the BTB, or by using the branch page address when a same page bit in the hit BTB entry is set.

30 Claims, 8 Drawing Sheets

APPARATUS AND METHOD FOR USING INSTRUCTION TRANSLATION LOOK-ASIDE BUFFERS IN THE BRANCH TARGET BUFFER

BACKGROUND

Technical Field

The disclosure generally relates to a microprocessor, and more specifically, to the execution and prediction of branch instructions by data processors.

Description of Related Art

Within data processing systems, branch target buffers (BTBs) are commonly used to predict the outcome of a branch and a taken target address of the branch so as to improve performance. As the microprocessor increases performance by increasing the number of pipeline stages and number of parallel instruction execution, the size of the branch target buffer (BTB) is typically increased in order to increase the hit rate and reduce the branch misprediction performance penalty. Furthermore, 4 GB of data memory is no longer enough for processing massive amount of data from the internet thus most high-end microprocessor requires 64-bit memory address instead of 32-bit memory address from 10 years ago. However, increasing the size of the BTB results in increased die area, access time, and power required for the BTB and its operation.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DESCRIPTION OF THE EMBODIMENTS

Figure 1:
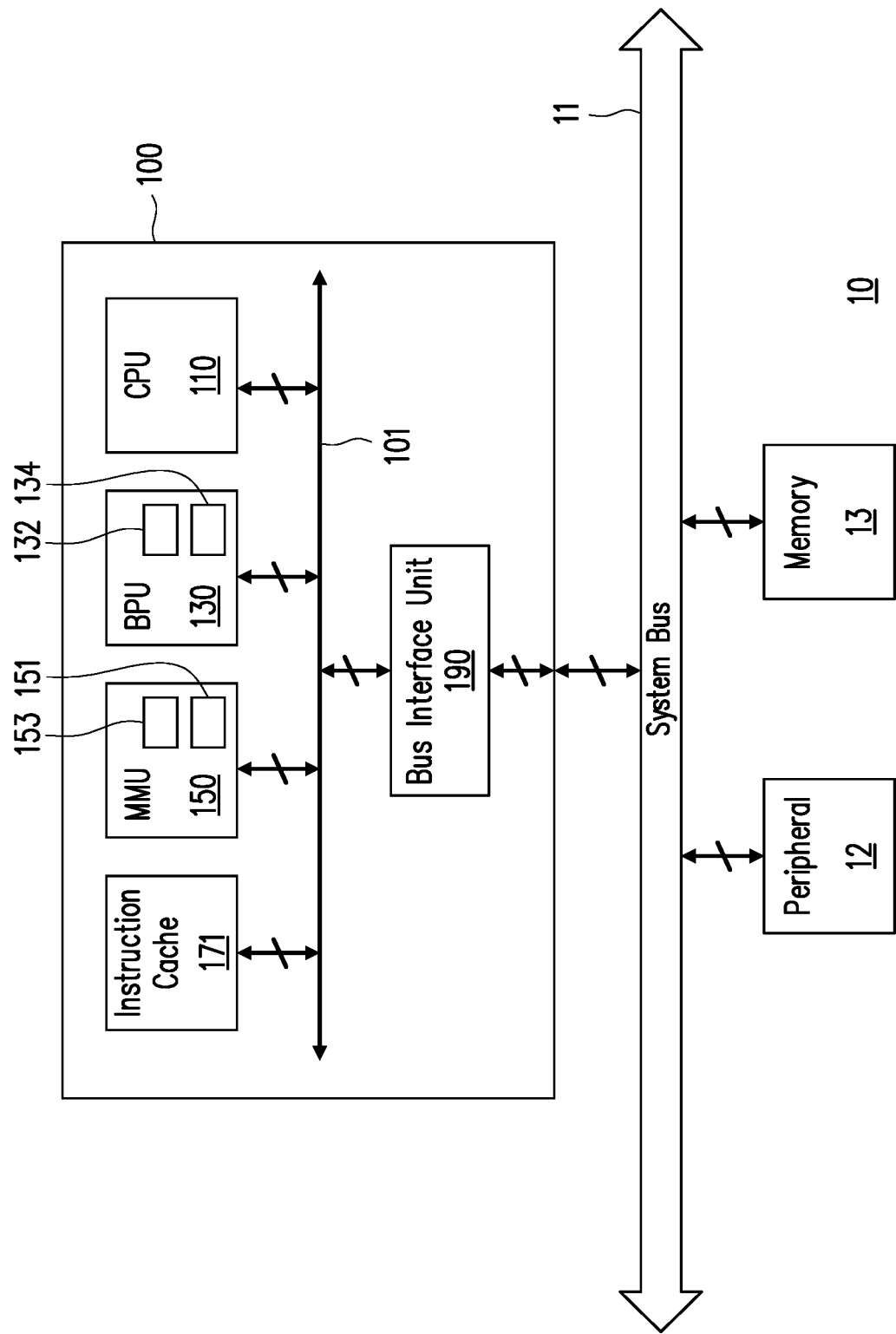
FIG. 1 is a block diagram illustrating a data processing system 10 according to some embodiments of the disclosure.

The following disclosure provides many different embodiments, or examples, for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

When an instruction is fetched, a branch target buffer (BTB) is accessed for branch prediction. The BTB stores predicted branch addresses and branch target addresses of previously executed branch instruction. In the disclosure, the branch page address in the BTB is replaced with the entry index and way of a translation lookaside buffer (TLB) for determining whether the instruction branch address is in the BTB. The TLB is utilized for instruction address translation, and thus the BTB size is reduced by using the existing TLB structure. Looking up the BTB requires in parallel accessing of the TLB to determine if a branch address is in the BTB. Accordingly, the BTB is not impacted by increasing the memory address bits (scalable) and uses much fewer number of bits than the traditional BTB.

FIG. 1 is a block diagram illustrating a data processing system 10 according to some embodiments of the disclosure. The data processing system 10 includes a processor 100, a system bus 11, a memory 13 and one or more peripheral(s) 12. The memory 13 is a system memory that is coupled to the system bus 11 by a bidirectional conductor that has multiple conductors. The peripheral(s) 12 is coupled to the system bus 11 by bidirectional multiple conductors. The processor 100 includes a bus interface unit (BIU) 190 that is coupled to the system bus 11 via a bidirectional bus having multiple conductors. The processor 100 may communicate with the peripheral(s) 12 or the memory 13 via the system bus 11. The bus interface unit 190 is coupled to an internal bus 101 via bidirectional conductors. The internal bus 101 is a multiple-conductor communication bus. The processor 100 includes a central processing unit (CPU) 110, a branch prediction unit (BPU) 130, a memory management unit (MMU) 150, and an instruction cache 171. The CPU 110 is a processor for implementing data processing operations. Each of CPU 110, BPU 130, MMU 150, and instruction cache 171 are coupled to the internal bus 101 via a respective input/output (I/O) port or terminal and communicate therebetween.

The processor 100 functions to implement a variety of data processing functions by executing a plurality of data processing instructions. The CPU 110 uses virtual addresses for the processing of instruction and data, and the MMU 150 translates virtual addresses to physical addresses before the accessing data outside of the CPU 110. The instruction address in CPU 110 is virtual address which must be translated by the MMU 150 in order for the CPU 110 to fetch instructions from instruction cache 171 or memory 13. Similarly, the data address in the CPU 110 is virtual address and must be translated by MMU 150 in order for the CPU 110 to fetch data from data cache (not shown) or memory 13. The branch target buffer (BTB) 132 included in the BPU 130 also uses virtual address, so that branch instruction address can access the BTB 132 for branch prediction directly without needing MMU 150 for a physical address translation of branch instruction address. Instruction cache 171 is a temporary data storage for frequently-used instructions that are needed by the CPU 110. Instructions needed by the CPU 110 that is not within instruction cache 171 is stored in memory 13. The memory 13 may include level 2 (L2) and level 3 (L3) caches and main memory. The L2 and L3 caches provides faster access times than the main memory. The L2 and L3 caches are temporary storage of frequent use instruction and data memory. The main memory may include at least one of random access memory (RAM), dynamic random access memory (DRAM), static random access memory (SRAM), read only memory (ROM), programmable read only memory (PROM), electrically programmable read only memory (EPROM), electrically erasable programmable read only memory (EEPROM), and flash memory.

The MMU 150 translates the virtual addresses from the CPU 110 to physical addresses utilized by the instruction cache 171 and the memory 13. The MMU 150 also includes an instruction translation lookaside buffer (iTLB) 151 and a level 2 translation lookaside buffer (L2 TLB) 153. The iTLB 151 and L2 TLB 153 store the recent translations of instruction address from virtual address to physical address, which may be used for quick address lookup. Similar to memory data, the iTLB 151 is a small TLB which keeps translations of virtual address to physical address for only instruction addresses. The MMU 150 may also have dTLB (not shown) for translation of virtual address to physical address for data addresses. The L2 TLB 153 is much larger TLB having many more entries than the iTLB 151. In the embodiments, the iTLB 151 and the L2 TLB 153 are shown in the MMU 150. However, the disclosure is not limited thereto. In other embodiments, iTLB 151 and the L2 TLB 153 may reside at some locations between the CPU and the instruction cache 171.

The bus interface unit 190 is only one of several interface units between the processor 100 and the system bus 11. The bus interface unit 190 functions to coordinate the flow of instruction and data related to instruction execution including branch instruction execution by the CPU 110. Control information and data resulting from the execution of a branch instruction are exchanged between the CPU 110 and the system bus 11 via the bus interface unit 190.

The BPU 130 is a branch prediction unit for branch instruction in the processor 100 which includes a branch target buffer (BTB) 132 and a branch history table (BHT) 134. The BTB 132 is a cache buffer for storing a plurality of entries. Each of the entries corresponds to an instruction address of the branch instruction and a branch target address associated with the branch instruction that were executed by the CPU 110. Therefore, CPU 110 executes the branch instruction and determines if the next instruction is as expected by the branch result, else the CPU 110 generates new instruction address which to send to the BPU 130 via the internal bus 101. The BTB 132 contains a set of all of the most frequently use branch instruction addresses that may be generated by CPU 110. The BHT 134 provides the prediction of taken or non-taken for associated entry in the BTB 132. The prediction of taken or non-taken is based on the past behaviors of the branch instruction. The BHT 134 can have many different algorithms and number of past behavior bits for branch prediction. As the branch prediction is correct or incorrect (branch mis-prediction), the BHT 134 is updated accordingly. The BHT 134 is not discussed in details in the disclosure, any prediction mechanism can be used. In response to receiving an instruction address from the CPU 110, the BTB 132 provides a branch target address corresponding to the branch instruction to the CPU 110 if the instruction address results in a BIB hit. As described above, the increase of memory size and instruction pipeline stages requires a larger BTB as well, which demands more die area, access time, and power required for the BTB and its operation. In the disclosure, the BTB 132 replaces the page addresses with the indices and ways of the L2 TLB 153 for the predicted branch instruction address and branch target address to determine BTB hit/miss and a branch target address of a taken branch. Detail of the BTB 132 and information stored therein would be described later.

Figure 2:
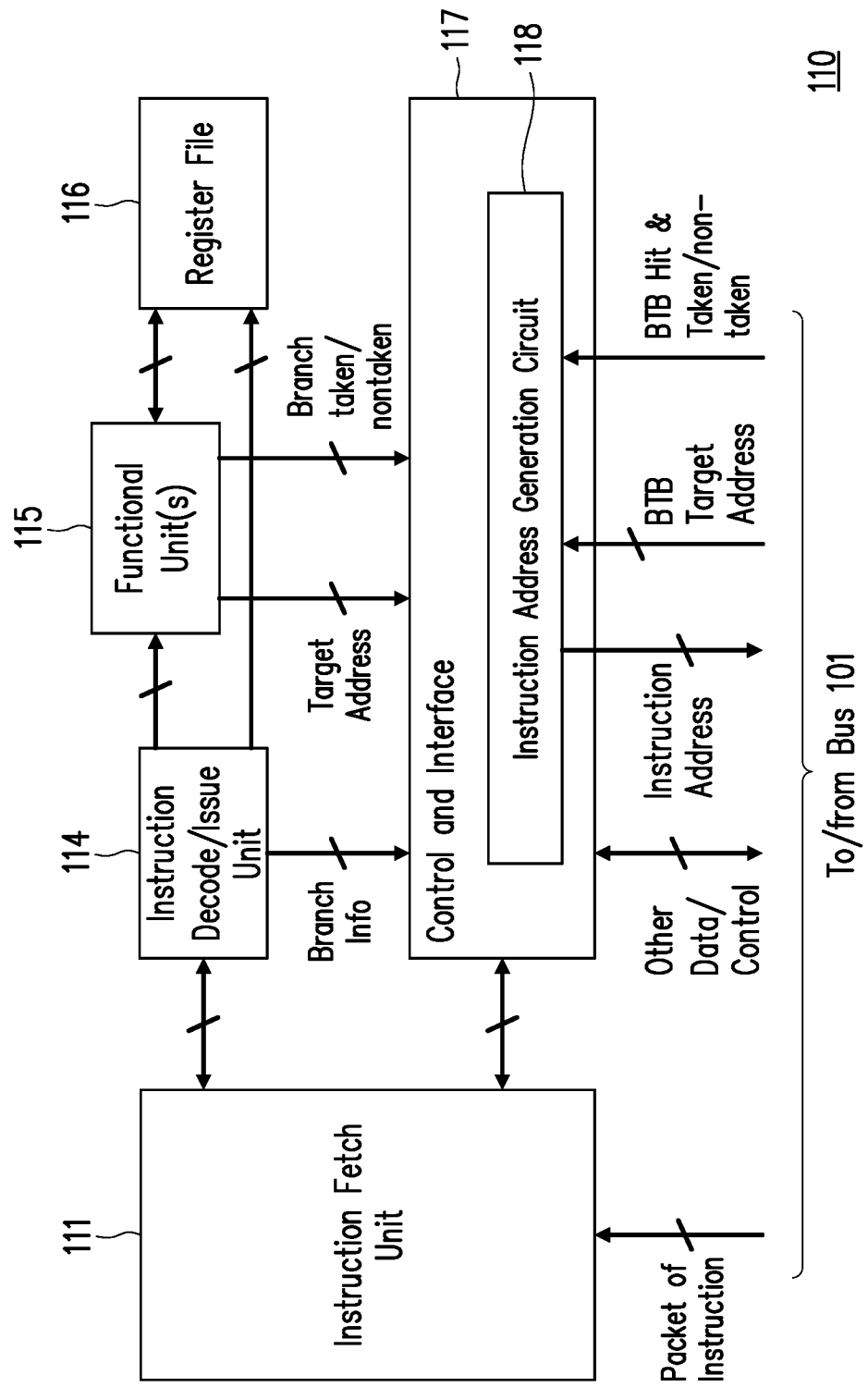
FIG. 2 is a block diagram illustrating instruction pipeline architecture of a CPU as illustrated in FIG. 1 according to some embodiments of the disclosure.

FIG. 2 is a block diagram illustrating instruction pipeline architecture of the CPU 110 as illustrated in FIG. 1 according to some embodiments of the disclosure. The CPU 110 includes an instruction fetch unit 111, an instruction decode/issue unit 114 (may also be referred to as instruction decode unit), one or more functional unit(s) 115, a register file 116, and a control and interface unit 117. The instruction fetch unit 111 includes an instruction buffer to temporary keep the instructions from instruction cache 171 or memory 13 of FIG. 1 before sending to instruction decode/issue unit 114. An output of the instruction fetch unit 111 is coupled to an input of an instruction decode/issue unit 114 for decoding fetched instructions. An output of the instruction decode/issue unit 114 is coupled to one or more functional unit(s) 115. The one or more functional unit(s) 115 is coupled to a register file 116 via a multiple conductor bidirectional bus. The instruction decode/issue unit 114 is also coupled to the register file 116 to obtain read and write control and information related to the instruction being executed by the functional units 115. In some embodiments, the instruction decode/issue unit 114 can make static branch prediction for backward taken branch or taken indication for unconditional branch and send the branch information to the control and interface unit 117. One of the functional units is to execute branch instruction in which the branch target address is calculated and determines the direction of the branch instruction, taken or non-taken. The branch target address and branch taken/non-taken information is sent to the control and interface unit 117. Additionally, the instruction fetch unit 111, the instruction decode/issue unit 114 and the functional unit(s) 115 are coupled via separate buses to respective input/output terminals of a control and interface unit 117 that interfaces to and from the internal bus 101.

The control and interface unit 117 has instruction address generation circuitry 118 having a first input for receiving a BTB hit indicator signal and taken/non-taken branch prediction via a multiple conductor bus from the BPU 130 via the internal bus 101. The instruction address generation circuitry 118 also has a second input for receiving a BTB target address of a taken branch via a multiple conductor bus from the BTB 132 via the internal bus 101. The instruction address generation circuitry 118 has a multiple conductor output for providing a branch instruction address, an executed branch target address and executed branch direction signals to the BPU 130 via the internal bus 101. Other data and control signals can be communicated via single or multiple conductors between the control and interface unit 117 and the internal bus 101 for implementing data processing instruction execution, as required. The control and interface unit 117 may include the data address generation circuit (not shown) for data access of the functional units 115 to a L1 data cache (not shown) and memory 13.

In the embodiments, the control and interface unit 117 controls the instruction fetch unit 111 to selectively identify and implement the fetching of instructions including the fetching of groups of instructions. The instruction decode/issue unit 114 performs instruction decoding for the one or more functional unit(s) 115. The register file 116 is used to support the one or more functional unit(s) 115. Within the control and interface unit 117 is instruction address generation circuitry 118. The instruction address generation circuitry 118 sends out an instruction address to the BPU 130. In response to the instruction address, a BTB target address is provided to the CPU 110 if there is a BTB hit along with the taken/non-taken prediction. The BTB target address with taken prediction is used by CPU 110 to obtain an instruction(s) at the BTB target address from the instruction cache 171 or from memory 13 if the address is not present and valid within instruction cache 171. In the embodiments, the BTB hit and BTB target address may be obtained by accessing the BTB 132, the iTLB 151 and/or the L2 TLB 153. In some embodiments, the basic block entry address is used instead to the branch instruction address. In compiler construction, a basic block is a straight-line code sequence with no branches in exception to the entry and no branches out except at the exit. In this context, the branch target address is the basic block entry address, and the basic block entry is used for BTB instead of the branch instruction address. The term branch instruction address (or branch address) in this disclosure is interchangeable with the term basic block entry address.

In the embodiments, instruction addresses are fetched by instruction fetch unit 111 (either individually or in groups of two or more at a time) from instruction cache 171 or memory 13. Each instruction address used by the instruction fetch unit 111 to fetch instruction(s) is sent to the BTB 132 for branch prediction. For example, if instruction address 1000 results in a BTB miss in BTB 132, it is assumed that instruction address 1000 is not a branch instruction, and processing of the instruction at instruction address 1000 continues through the pipeline of CPU 110 (and indication of the miss may be provided to CPU via the BTB prediction information). However, if instruction address 1000 results in a BTB hit in BTB 132, it is assumed that there is a branch instruction associated with the instruction address 1000, and the BTB prediction information may be used to determine whether the branch instruction should be taken or not taken. If, for example, instruction address 1000 results in a BTB hit in BTB 132, and the prediction information associated with the BTB entry in the BHT 134 indicates that the predicted branch is taken, then the instruction address generation unit 118 may provide the BTB target address (received from BIB 132) to instruction fetch unit 111 or directly to the L1 instruction cache 171 to fetch speculatively begin at the predicted branch target address. Eventually, the instruction at instruction address 1000 reaches instruction fetch unit 111 and proceeds through the instruction pipeline of CPU 110. That is, it is provided from the instruction fetch unit 111 to the instruction decode/issue unit 114 for decode, and then to the functional unit(s) 115 for execution (which may access register file 116, as needed). If the instruction address 1000 is decoded as a branch instruction, the branch instruction is resolved in the functional unit(s) 115. In detail, when the branch instruction at instruction address 1000 is executed by the functional unit(s) 115, the branch target address is calculated and the branch direction (taken or non-taken) is determined. The executed branch target address and taken/non-taken information are sent from the function unit(s) 115 to the instruction address generation circuit 118, where the executed branch is compared to the predicted branch information. Since the branch instruction at the instruction address 1000 is executed and resolved, it can be determined whether or not the BPU 130 correctly predicted the branch instruction of instruction address 1000 as a taken or non-taken branch. If the branch was correctly predicted, execution continues from the current location and the BHT 134 may be updated with the correct prediction. If the branch was mispredicted, CPU 110 can address the misprediction. For example, the CPU 110 may flush the pipeline as needed, and fetch new instruction stream based on the result of the branch execution in the functional unit(s) 115. A misprediction may occur when a BTB hit occurs in BPU 130, but the branch is not correctly predicted as taken or not taken, or may occur if BPU 130 correctly predicts the branch as taken but incorrectly predicts the branch target address. A misprediction may also occur if the branch instruction is not in BTB (BTB miss) but is detected by the branch execution as taken branch, or may also occur if instruction address 1000 has a BTB hit in BTB 132 but turns out not to be a branch instruction. The instruction address generation circuit 118 tracks all branch prediction addresses and information and detects the branch misprediction or incorrect branch to update the BTB 132 and/or BHT 134. For example, it may be determined by instruction decode/issue unit 114 that the instruction at the instruction address 1000 was actually not a branch instruction, which also results in a misprediction needing to be addressed by CPU 110.

Figure 3A:
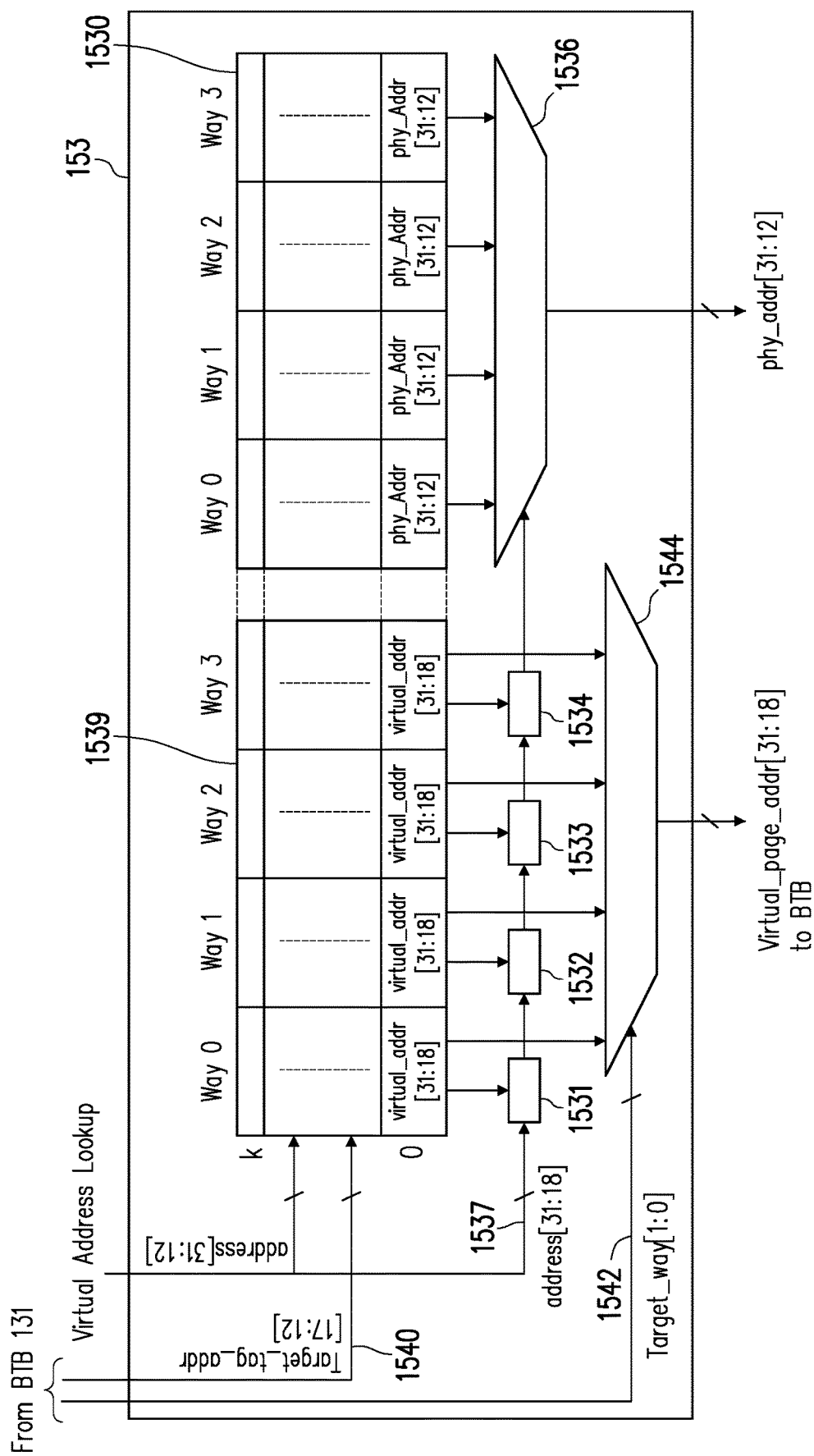
FIGS. 3A and 3B are block diagrams illustrating a process flow of a branch prediction between different portions of the processor 100 according to some embodiments of the disclosure.
Figure 3B:
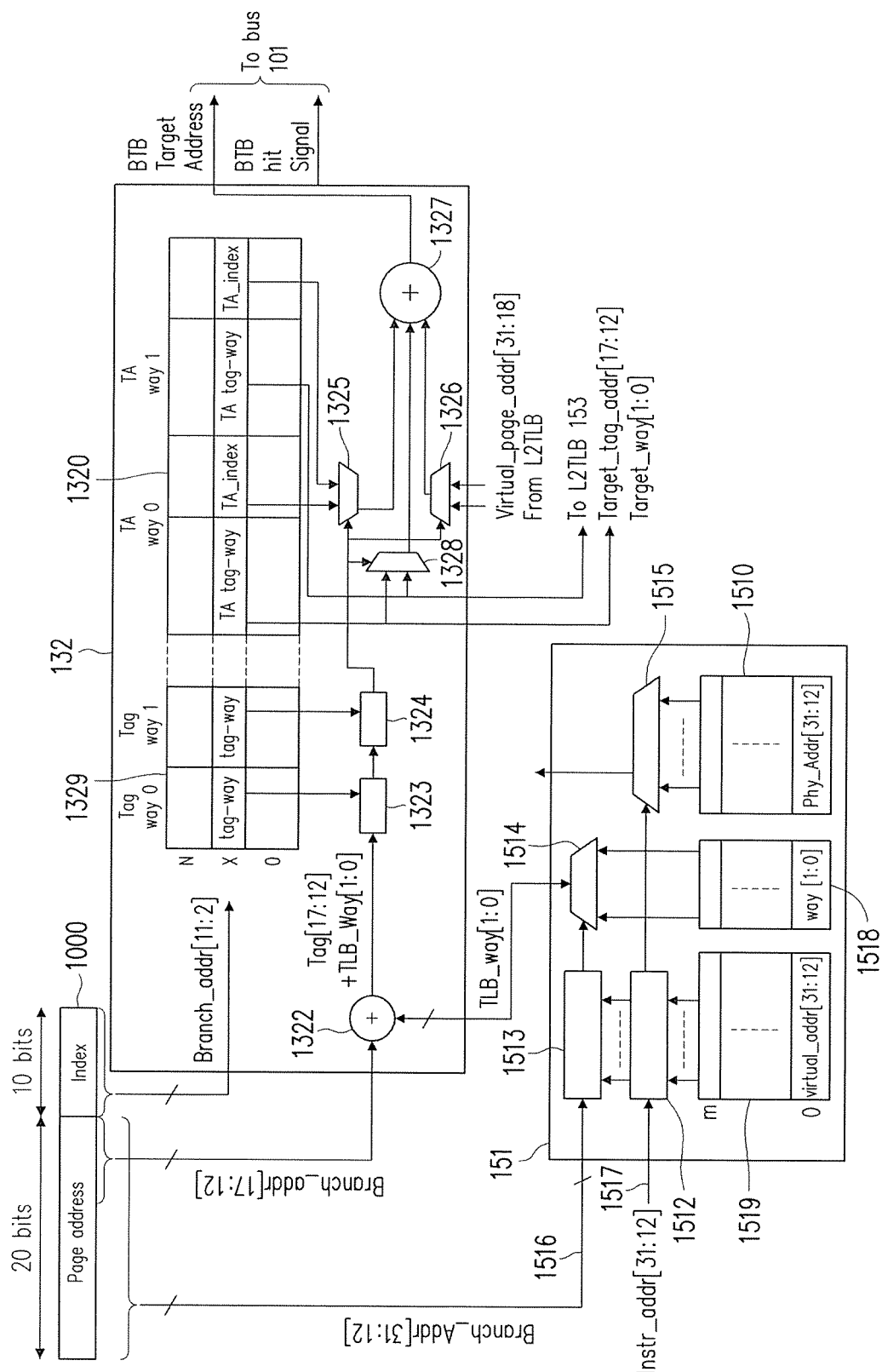

FIGS. 3A and 3B are block diagrams illustrating a process flow of a branch prediction between different portions of the processor 100 according to some embodiments of the disclosure. The memory space is broken into many memory pages, and each memory page is a fixed size of 4K bytes or any pre-determined size by the system memory. In some embodiments, the 4K-byte is addressed by inst_addr[31:12] of the instruction address for 32-bit address memory. As described above, all addresses processed within CPU 110 are virtual addresses which must be translated to physical addresses in order to access memory 13 or any physical memory outside of the processor 100. The virtual page address is translated to the physical page address, i.e. virtual_addr[31:12] is translated to physical_addr[31:12], and the addr[11:0] is the same for both virtual and physical addresses. In the embodiments, a first portion of the instruction address (i.e., inst_addr[31:12]) is used to access TLBs for translating virtual page address of the instruction to the physical page address.

With reference to FIG. 3A, a level 2 translation look-aside buffer (L2 TLB) 153 of some embodiments is illustrated. The L2 TLB 153 is a cache array having a tag array 1539 and a data array 1530. The tag array 1539, or virtual address tag array, is an array of virtual addresses while the data array 1530, or physical address array, is an array of physical addresses. The L2 TLB 153 is illustrated as a 256-entry TLB with 4-way set associative in which the L2 TLB is organized with 4 sets of 64-entry array. The number of entries is illustrated as 0 to k entry, where k is 63 in this example. Each entry of the L2 TLB 153 includes a virtual tag address (e.g., virtual_tag[31:12]) in the virtual address array 1539 and a physical address (e.g., phy_addr[31:12]) in the physical address array 1530. Although 4 way set associative cache is used in the embodiments, however, the disclosure is not intended to limit the set associativity of the L2 TLB. The L2 TLB 153 of the disclosure may be implemented to have a various number of ways. In other embodiments, the L2 TLB array 153 may be 2-way set associativity, 8-way set associativity, n-way set associativity and so on. In other embodiments, the L2 TLB 153 may be fully associative or direct mapped. Furthermore, the L2 TLB 153 is shared between instruction and data addresses, in some embodiments, the L2 TLB 153 may include L2 iTLB which is specifically used for instruction address only and another L2 dTLB which is specifically used for data address only.

In an operation of virtual address look up (or virtual address translation), a virtual page address of the instruction, e.g., inst_addr[31:12] on bus 1537, is provided for translation, where the inst_addr[31:12] is used to look up the virtual address tag array 1539 for TLB hit/miss. If TLB hit, then the corresponding entry in the physical address array 1530 is fetched as the translated physical address (e.g., phy_address[31:12] at output of MUX 1536). If TLB miss, then the virtual address is not in the L2 TLB 153, hardware table walk (not shown) or software interrupt is used to fetch the translated physical address to replace an entry in the L2 TLB 153. The L2 TLB array 153 stores the virtual page addresses of previously executed instructions and data. If the branch instruction address has a hit in the virtual address array 1539, then it is a valid virtual page address. In the embodiments, the L2 TLB 153 includes four comparators 1531, 1532, 1533, 1534, one for each of the 4 associative ways, and MUX 1536 for selecting the physical address by using the hit way signal from one of the comparators. The virtual page address, i.e., inst_addr[31:12] on bus 1537, is used to look up the virtual address tag array 1539 for TLB hit by comparing the virtual page address (e.g., inst_addr[31:18]) with the virtual tag address (e.g., virtual_tag[31:18]) using the four comparators 1531, 1532, 1533, and 1534 in which a hit way signal from one of the 4 comparators is used to select the physical page address from the physical address array 1530 through the MUX 1536.

Since the BPU 130 uses only virtual address, the physical address array 1530 of the L2 TLB 153 is not used by the BPU 130. The embodiment uses valid entries in the virtual address array 1539 for branch prediction. As described above, the entries in the virtual address array 1539 represent valid virtual page addresses of previously executed instructions. In the embodiments, the virtual page address of the branch target address can be looked up in the L2 TLB 153 by using the virtual target_addr[17:12] of the bus 1540 and the way associative, i.e., target_way[1:0] of the bus 1542, from the BTB 132 during a branch prediction. In detail, the (virtual) target_addr[17:12] of bus 1540 is decoded into an entry x among the 0 to k entries in each way of the L2 TLB 153, where the virtual_tag[31:18] of the entry x can be read from the virtual address array 1539 from each of 4 sets of way associative. The target_way[1:0] of bus 1542 is used to select one of the four virtual_tag[31:18] associated to the entry x in the virtual address array 1539 through MIX 1544 as the virtual page address of a portion of branch target address (i.e., virtual_page_addr[31:18]). It should be noted that the merging of the virtual_page_addr[31:18] and the target_addr[17:12] forms the full target address for the BTB target address. As described above, the virtual page address [31:12] can be looked up from the virtual address array 1539 of L2 TLB 153 from a 6-bit tag address (e.g., target_addr [17:12]) and a 2-bit way associative (e.g., target_way[1:0]). Therefore, the disclosure replaces the branch address[31:12] in a conventional BTB with branch address[17:12] and way associative bits (e.g., TLB_way[1:0]) from L2 TLB, which is much fewer bits as compared to conventional BTB. Note that both virtual address lookup through bus 1537 and the target_address lookup through bus 1540 and 1542 can happen at the same time in which case the control logic for L2 TLB will delay the virtual address lookup through bus 1537 by 1 clock cycle. Further description of the target address look up through L2 TLB 153 would be described later.

FIG. 3B illustrates an example of the iTLB 151 according to some embodiments of the disclosure. The iTLB 151 is a cache array having a virtual address tag array 1519 and a physical address array 1510. The tag array 1519, or virtual address tag array, is an array of virtual addresses while the data array 1510, or physical address array, is an array of physical addresses. Each entry of the iTLB 151 includes a virtual tag address (e.g., virtual_addr[31:12]) in the virtual address tag array 1519 and a physical address (e.g., phy_addr[31:12]) corresponding to the virtual tag address in the physical address array 1510. The iTLB 151 keeps the most recently used virtual addresses and has fewer entries in comparison to the L2 TLB 153. For example, the iTLB 151 can have 8 entries in which case fully associative can be used. In an instruction address translation from virtual address to physical address, all 8 entries of the virtual address tag array 1519 can be compared in the comparator 1512 to the instruction address (i.e., inst_addr[31:12]) of bus 1517 at the same time. The physical page addresses from the physical address array 1510 are read and selected by the MUX 1515 by the hit way signal from the comparator 1512. The instruction address translation to physical address is needed for the instruction fetch unit 111 to fetch instructions from the instruction cache 171 or memory 13. If the inst_addr[31:12] is not in the virtual address tag array 1519. e.g. TLB miss, then the iTLB 151 sends request to L2 TLB 153 for new physical address to replace an entry in the iTLB 151.

As described above, the embodiments simplified the branch instruction look up by replacing the virtual page address of the branch instruction (i.e., branch_addr[31:12]) with a 6-bit tag address and a 2-bit way associative. The branch prediction is based on virtual address and uses only virtual address tag array 1519 and not using the physical address array 1510 of the iTLB 151. In the embodiments, the iTLB 151 further includes a L2 TLB way array 1518 for branch prediction. Each entry of the iTLB way array 1518 includes a L2 TLB way associative (e.g., TLB_way[1:0]) and is associated a virtual address in the virtual address tag array 1519. The L2 TLB way array 1518 is used to translate the virtual page address of a branch address to a L2 TLB way (e.g., TLB_way[1:0]) which is used for branch prediction. For example, the branch address, branch_addr[31:12], of bus 1516 is used to access the iTLB 151 for translating the branch address into a TLB way associative address TLB_way[1:0] which would be transmitted back to the BTB 132 to determine whether there is a BTB hit or not. Note that both virtual instruction address lookup through bus 1517 and the target_address lookup through bus 1516 can happen at the same time through independent comparators 1512 and 1513 and independent MUXs 1515 and 1514, respectively. The detail of the branch prediction would be discussed later.

FIG. 3B also illustrates an example of BTB 132 according to some embodiments of the disclosure. In the embodiments, the BTB 132 is a 2048-entry BTB with 2-way associative cache in which the BTB 132 is organized with 2 sets of 1024-entry array. The number of entries is illustrated as 0 to N entry, where N is 1023 in this example. The BTB 132 is a cache array having a tag array 1329 and a data array 1320. The tag array 1329, or branch tag array, is an array of (virtual) branch tag address (tag_addr[17:12]) and TLB way associative (TLB_way[1:0]) while the data array 1520, or branch target address array, is an array of target address (target_addr[17:12]), target address way associative (target_way[1:0]), and target index address (index[11:2]). The BTB array 132 stores the branch addresses of previously executed branch instructions. Each entry of the BTB 132 includes a branch tag (i.e., branch tag address and TLB way associative) and a branch target address (i.e., target address, target address way associative and target index address) corresponding to the branch tag. Although the BTB 132 is illustrated as a 2-way associative cache, the BTB 132 of the disclosure may be implemented to have a various number of ways. In embodiments, the BTB array 132 may be 4-way set associativity, 8-way set associativity, and n-way set associativity. In other embodiments, the BTB array 132 may also be fully associative or direct mapped. The BTB 132 also includes two comparators 1323, 1324, one for each of the 2 associative way, and MUX 1325, 1326, and 1328 are used for selecting the target address according to the way-hit signal from the comparators 1323, 1324.

In the embodiments, the branch prediction is performed by using branch_addr[17:12] (6-bit tag address) and L2 TLB way [1:0] (2-bit way associative) for determining BTB hit/miss. Therefore, the entries of the BTB 132 keeps only the branch_addr[17:12] and L2 TLB way[1:0] in the branch tag portion for identifying whether an instruction is a branch instruction. When an instruction address (address of a branch instruction is branch address) is received by the BTB 132, the branch_addr[31:12] needs to be translated to the L2 TLB way associative (i.e., TLB_way[1:0]). In the embodiments, this translation is done by accessing the iTLB 151. The translation process is from virtual page address (i.e., branch_addr[31:12]) to L2 TLB way (i.e., TLB_way[1:0]). With reference to FIG. 3B, the branch_addr[31:12] of bus 1516 is used to access iTLB 151, where the branch_addr [31:12] is compared to the entries of the virtual address tag array 1519 through a comparator 1513 for TLB hit. The L2 TLB ways (i.e., TLB_way[1:0]) from the iTLB way array 1518 are read and selected by the MUX 1514 by the way-hit signal from the comparator 1513. The selected L2 TLB way, which is associated with the branch_addr[31:12], is sent to BTB 132. The tag portion of the branch address (i.e., branch_addr[17:12]) and the L2 TLB way (e.g., TLB_way [1:0]) selected from the iTLB 151 are then used to compare with the tag_addr[17:12] and tag_way[1:0] from the branch tag array 1329 of the BTB 132 for BTB hit/miss. If the comparator 1513 outputs TLB miss, then the branch_addr [31:12] is sent to L2 TLB 153 to fetch the new L2 TLB way to replace an entry in the iTLB 151. In addition, since both physical address array 1510 and L2 TLB way arrays 1518 are associated with the same virtual address tag array 1519, the replacement of one entry in the iTLB requires updating both the L2 TLB way in the L2 TLB way array 1518 and the physical address in the physical page address array 1510. The branch prediction through BPU 130 is mostly ahead of the instruction fetch unit 111, so if the branch address is not in the iTLB 151, then the TLB miss in the iTLB 151 fetches the physical address from the L2 TLB 153 ahead of the instruction fetch unit 111.

Although both the TLB way array 1518 and the physical address array 1510 are illustrated in FIG. 3B as part of the iTLB 151, the disclosure is not intended to limit the implementation of the iTLB. In another embodiment, the iTLB 151 can be implemented as 2 independent iTLBs. For example, a first iTLB may include the virtual address tag array 1519 and the TLB way array 1518 which is used for translating virtual page address to L2 TLB way, while a second iTLB may include the virtual address tag array 1519 and the physical address array 1510 which is used for translating virtual page address to physical page address. The advantage of independent TLB way iTLB is smaller size thus fewer bits are needed for the tag address and way in the BTB 132.

In another embodiment, the L2 TLB 153 can restrict the ways for the virtual instruction address. For example, the virtual instruction address can only replace way 0 and way 1 of the 4-way associative L2 TLB. In this case, the tag way of the BTB 132 and TLB way of iTLB 151 is reduced to a single bit tag way instead of 2-bit tag way for 4 way associative of the L2 TLB.

Yet, in another embodiment, the virtual page can have many different sizes. For example, the virtual page size can be 4K-byte or 4M-byte. The 12 TLB 153 can be design with smallest page size of 4K-byte and adding a bit(s) to the virtual address tag array 1539 to indicate the entry is from a larger page-size to adjust the comparators 1531-1534 for comparing of the appropriate address bits.

With reference to FIGS. 2 and 3B, an instruction address (e.g., inst_addr[31:0]) is received and provided to the control and interface unit 117, where the control and interface unit 117 provides the instruction address to the bus 101 as a branch address 1000 (e.g., branch_addr[31:0]) for branch prediction. In the embodiments, the branch address 1000 may be a 32-bit memory address (e.g., branch_addr[31:0]), which includes a virtual page address (e.g., 20 bits, branch_addr[31:12]) starting from the most significant bit of the branch addresses 1000, followed by an index address (e.g., 10 bits, branch_addr[11:2], may also be referred to as index[9:0]); since the instructions in this example is word size, bits [1:0] are for byte and half-word address and not used for word address.

When the branch address 1000 is provided for the branch prediction, the branch_addr[17:2] is used to access the BTB 132 and branch_addr[31:12] is used to access iTLB 151. In the disclosure, the accessing of the BTB 132 and the iTLB 151 may occur in parallel or one after another in time in which the disclosure is not intended to limit the access timing or sequence of the BTB 132 and iTLB 151 for the branch prediction. In detail, the branch_addr[31:12] is translated to TLB_way[1:0] by accessing the iTLB 151, and then the TLB_way[1:0] from the iTLB 151 is provided to the BTB 132 and used with the branch_addr[17:2] to look up the branch tag array 1329 in the BTB 132 for determining BTB hit/miss. If BTB hit, branch target address corresponding to the branch instruction 1000 may be obtained by accessing L2 TLB 153 with the target_addr[17:12] and target_way[1:0] of the BTB entry corresponding to the BTB hit. The operation of the branch prediction would be described in detail below.

With reference FIG. 3B, the page address portion of the branch address (i.e., branch_addr[31:12] is provided to the iTLB 151 for translating the page address portion of the branch address into the L2 TLB way (i.e., TLB_way[1:0].) In detail the branch_addr[31:12] is provided to the comparator 1513, where the virtual address (i.e., virtual_addr [31:12]) of each entry of the iTLB 151 matched with the branch_addr[31:12]. If a TLB hit in iTLB 151, the TLB_way [1:0] corresponding to the iTLB entry having the TLB hit is selected through the MUX 1514 according to the way-hit signal outputted by the comparator 1513. The TLB_way[1: 0] is then provided to the BTB 132 for determining BTB hit/miss. If there is a TLB miss in the iTLB 151, the branch_addr[31:12] is sent to L2 TLB 153 to fetch the new L2 TLB way to replace an entry in the iTLB 151. For example, the branch_addr[31:12] is provided to the L2 TLB 153 as the address[31:12] illustrated in FIG. 3A for a virtual address lookup. Since both physical address array 1510 and L2 TLB way arrays 1518 are associated with the same virtual address tag array 1519, the replacement of an entry in the iTLB 151 requires updating both the L2 TLB way in the L2 TLB way array 1518 and the physical address in the physical page address array 1510. It should be noted that, in FIG. 3A, the "address[31:12]" or "address[31:18]" shown on the bus 1537 may be referred to as an instruction address (i.e., inst_address) if the address is not coming from BTB. If the address is coming from BTB 132, the "address[31:12]" or "address[31:18]" shown on the bus 1537 would be referring to the branch address (branch_addr), which is may be viewed as a virtual address look up operation requested by the BTB 132.

In the BTB 132, a portion of the page address of the branch instruction 1000 (i.e., branch_addr[17:2]) is provided to look up the BTB array. In detail, the index portion of the branch address 1000 (i.e., branch_addr[11:2]) is decoded into an entry x of the 0 to N entries, where the tag address (i.e., tag_addr[17:12]) and way associative (i.e., tag_way[1:0]) can be read from the branch tag array 1329 of each set of way associative and the target tag address (i.e., target_addr[17:12]) from each set of way associative, and the target way associative (i.e., target_way[1:0]) can be read from the target address array 1320 of each set of way associative. The merging logic 1322 merges (or concentrates) the branch_addr[17:12] and the TLB_way[1:0] from iTLB 151 to form a 8-bit address to compare to the 8-bit data from the branch tag array 1329. That is, the concentrated address of the branch_addr[17:12] and the TLB_way[1:0] from the iTLB 151 is compared to the tag_addr[17:12] and the tag_way[1:0] from each set of way associative of the tag array 1329 using two comparators 1323, 1324. The hit-way signal from one of the 2 comparators indicates a BTB hit and is used to select the target address through the MUXs 1325, 1326, and 1328. Also, two sets of target_addr[17:12] and target_way[1:0] corresponding the entry x are read from the target address array 1320, which are provided to the L2 TLB 153 for virtual address translation. If BTB miss, the branch address 1000 is not in the BTB 132, the BPU 130 waits for the CPU 110 to execute the branch instruction and generates branch misprediction in order to update the BTB 132.

With reference to FIG. 3A, each set of the target_addr[17:12] and the target_way[1:0] from the BTB 132 are translated to a virtual page address (i.e., virtual_page_addr[31:18]) through the L2 TLB 153. The target_addr[17:12] is sent to the iTLB 153 through bus 1540 and decoded into an entry x among the 0 to k entries in each way of the L2 TLB 153. The virtual_addr[31:18] of the entry x can be read from the virtual address array 1539 from each set of way associative. The target_way[1:0] is sent to the iTLB 153 through bus 1542 and used to select one of the four virtual_addr[31:18] associated to the entry x in each way associative of the virtual address array 1539 through MUX 1544 as the virtual page address of a portion of branch target address (i.e., virtual_page_addr[31:18]). In the embodiments, the L2 TLB 153 sends two translated virtual page addresses (i.e., virtual_page_addr[31:18]) back to the BTB 132 for generation of full branch target address of the branch instruction.

Referring back to FIG. 3B, two virtual_page_addr[31:18] are provided to the MUX 1326 of the BTB 132, where one of the virtual_page_addr[31:18] is selected according to the hit-way signal from one of comparators 1323, 1324. The hit-way signal from one of the comparators 1323, 1324 is also provided to select one of the target_index[11:2] and one of the target_addr[17:12], associated with the entry x, from the target address array 1320 through the MUX 1325 and the MUX 1328, respectively. The merging logic 1327 takes target_index[11:2] and target_addr[17:12] from the target address array 1320 and virtual_addr[31:18] from L2 TLB 153 to form 30-bit target address. In another embodiment, a single target_addr[17:12] and target_way[1:0] can be selected by mux 1328 before sending to L2 TLB 153 for translation to virtual_page_addr[31:18]. The single virtual_page_addr[31:18] is returned from L2 TLB 153 and is merged with the target_addr[17:12] and target_index[11:2] by the merge logic 1327. The mux 1326 is not needed in this embodiment. In another embodiment, the branch address and the target address can be in the same virtual page address in which case the branch_addr[31:12] can be used for target address without translation by the L2 TLB 153. The target address array 1320 may include extra bit, e.g. "same page", to use the branch_addr[31:12] for target_addr[31:12] instead of accessing the L2 TLB 153.

In the embodiment a 32-bit branch address as illustrated in FIG. 3B is used for the purpose of illustration, however, the disclosure is not intended to limit thereto. In alternative embodiments, the order of the page address portion and index within the branch address 1000 may be changed based on the design requirement. Furthermore, the embodiments are not intended to limit the size of the instruction address. In other embodiments, the instruction address may be 64 bits, 128 bits or other number of bits. Regardless of the size of the instruction address, the number of the bits for the tag-way and index would be the same for the purpose of branch prediction using a branch prediction buffer. Thus, the BTB is said to be scalable with memory address bits or memory sizes.

To perform a branch prediction on the branch address 1000, the BPU 130 then provides the BTB hit, taken prediction, and BTB target address to the CPU 110, where the CPU 110 may place the predicted branch instruction in the instruction pipeline. For example, the instruction fetch unit may fetch the stream of instructions at the BTB target address. In one of the embodiments, the BTB target address may be provided to the beginning of the branch prediction in the BTB 132 directly (as with basic block branch prediction) as to perform the branch prediction on the BTB target address. Details of each elements and communication therebetween would be described below.

In one of the embodiments, a single TLB is used instead iTLB and L2 TLB. The single TLB has the same structure as the L2 TLB where the branch_addr[31:12] look up the TLB through bus 1537. The comparators 1531, 1532, 1533, and 1534 determine the hit way which is the TLB_way[1:0] for tag_way[1:0] comparison in the BTB 132 by comparators 1323 and 1324. The single TLB can perform translation of target_addr[17:12] and target_way[1:0] for virtual_addr[31:12] by the virtual tag array 1539. The TLB way array is added to the single TLB array.

Figure 4:
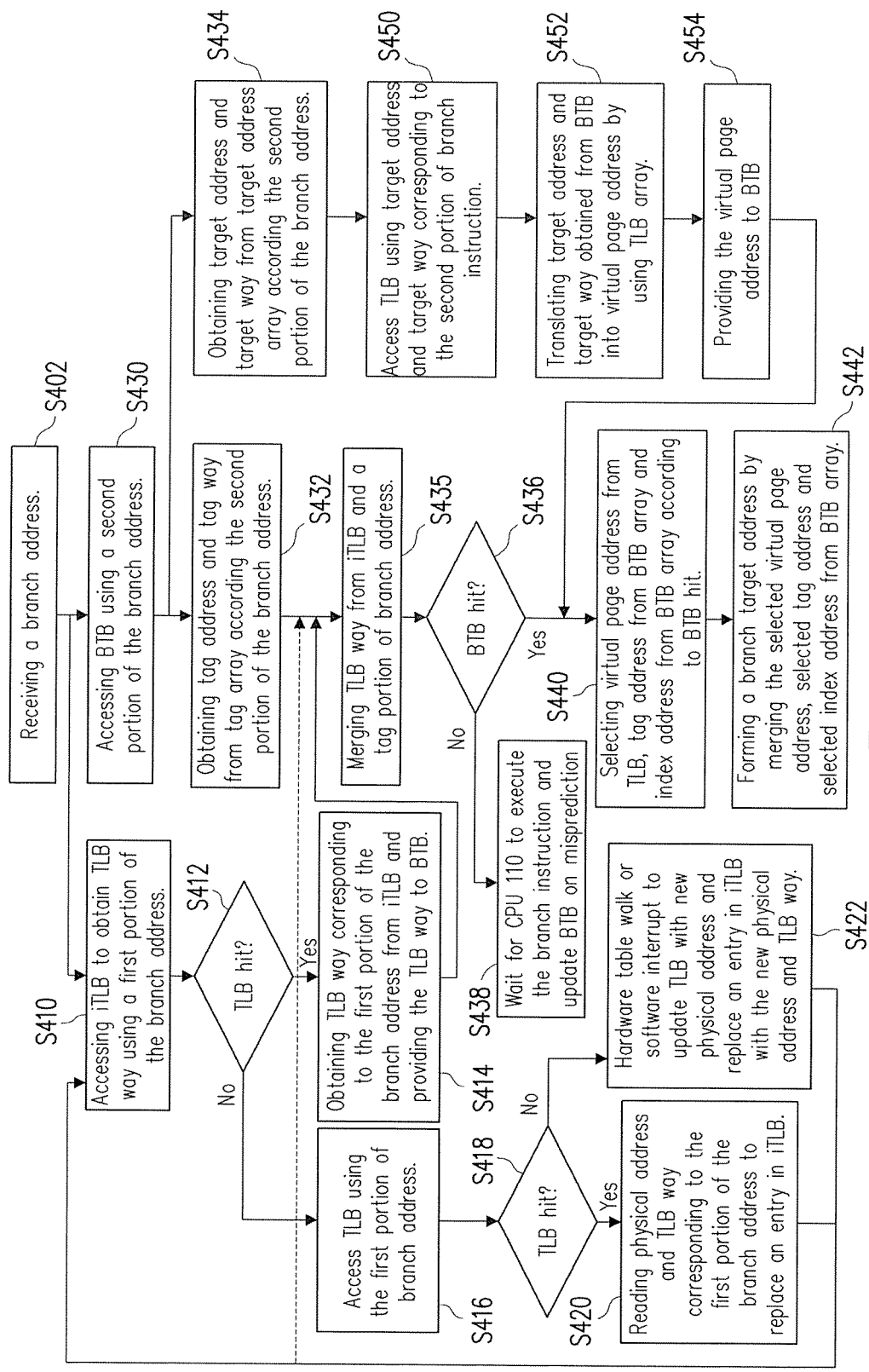
FIG. 4 is a flow diagram illustrating a process of branch prediction according to some embodiments of the disclosure.

FIG. 4 is a flow diagram illustrating the branch prediction process to generate the branch target address according to some embodiments of the disclosure. In step S402, a branch address (e.g., branch_addr[31:0]) is received from the instruction address generation circuit 118 or from the BTB 132 (i.e., the predicted branch target address from previous instruction is provided for branch prediction). The branch address may also be from branch misprediction of branch execution of functional units 115, or from external interrupt to the CPU 110, or from exception in the CPU pipeline, or from predicted taken of BPU 130. The number of sources of branch address and requests are not limited to the above list and can be from other sources depended on the type of processor. The branch address is sent to both the iTLB 151 for accessing through in step S410 and the BTB 132 for accessing in step S430, as to perform a branch prediction on the branch address.

In the step S410, the iTLB 151 is accessed to obtain TLB way associative (e.g., TLB_way[1:0]) by using a first portion of the branch address. In the embodiments, the first portion of the branch address is referred to the page address portion of the branch address, e.g., branch_addr[31:12]. As discussed above, the iTLB 151 of the embodiments includes a L2 TLB way array 1518, where each entry of the L2 TLB way array includes a TLB way associated with a virtual address (e.g., virtual_addr[31:12]) in the virtual address tag array 1519.

In step S412. TLB hit/miss is determined. In detail, the page address portion of the branch address is compared to the virtual address in the tag array 1519, as to determine whether there is a TLB hit in the iTLB 151. If TLB hit ("Yes" path of step S412), the process goes to step S414 for determining BTB hit/miss. If TLB miss ("NO" path of step S412), the process goes to step S416 for fetching an entry corresponding to the first portion of the branch address.

In the step S414, i.e., TLB hit in iTLB 151, the L2 TLB way corresponding to the matched virtual address in the tag array 1519 is fetched from the TLB way array 1518 and provided to the BTB 132 for determining BTB hit/miss.

In the step S416, i.e., TLB miss in iTLB 151, L2 TLB 153 is access by using the first portion of the branch address. The first portion of the branch address (i.e., branch_addr[31:12]) is used to look up the virtual address tag array 1539 in the L2 TLB 153 for TLB hit/miss (step S418). If TLB hit in the L2 TLB 153 (i.e., Yes path of step S418), the process goes to step S420. In the step S420, new physical address corresponding to the first portion of the branch address (i.e., a match in the virtual address tag array 1539) is fetched from the physical address array 1530, and the way associative of the L2 TLB 153 that is associated with the new physical address is also obtained. The physical address and the way associative newly obtained from the L2 TLB 153 according to the first portion of the branch address would replace an entry in the iTLB 151. Then, the process goes back to the steps S410, S412, S414 for translating the first portion of branch address into TLB way associative (i.e., TLB_way[1:0]) through the iTLB 151 and providing the TLB way associative to the BTB 132. If TLB miss in the L2 TLB 153 (i.e., No path of step S418), the process goes to step S422. In the step S422. Hardware table walk or software interrupt is used to fetch new physical address for updating the L2 TLB 153, and the new physical address and the TLB way associative corresponding to the entry of the L2 TLB 153 for storing the new physical address are updated to the iTLB 151. Then, the process goes back to the steps S410, S412, S414 for translating the first portion of branch address into TLB way associative (i.e., TLB_way[1:0]) through the iTLB 151 and providing the TLB way associative to the BTB 132.

In an alternative embodiment, the steps S422 and S420 may provide the way associative of the L2 TLB 153 corresponding to the new physical address directly to the step S434 and skip the steps S410, S412, S414. This is illustrated in FIG. 4 with a dashed arrow line. In other words, the iTLB 151 is not accessed again to read the TLB way associative from the replaced iTLB entry. Instead, the TLB way associative may be provided to the BTB 132 directly after the corresponding TLB way associative is obtained through the L2 TLB 153 in step S418 or hardware table walk in step S422.

In the step S430, the BTB 132 is accessed by using a second portion of the branch address. In the embodiments, the second portion of the branch address refers to a tag portion (e.g., branch_addr[17:12]) and an index portion (e.g., branch_addr[11:2]) in the branch address, where the index portion is used to index the BTB 132 to an entry of the BTB array. It should be noted that the BTB 132 of the embodiments is a 2-way associative cache, and therefore, two sets of the tag address, tag way, target address, and target way are read in response to the BTB access. In other words, each way of the BTB 132 would output the corresponding address and way associative in response to the BTB access using the second portion of the branch address. Detail of the BTB access and formation of the branch target address if there is a BTB hit are described below.

In step S432, the tag address (e.g., tag_addr[17:12]) and tag way (e.g., tag_way[1:0]) are read from the indexed entry from the tag array 1329 according to the second portion of the branch instruction, where the tag_addr[17:12] and the tag_way[1:0] are used for determining BTB hit/miss in step S436. In step S436, the tag portion of the branch address (e.g., branch_addr[17:12]) is merged with the TLB way associative (e.g., TLB_way[1:0]) obtained from the iTLB 151 in step S414. Then, the merged address (i.e., branch_addr[17:12]+TLB_way[1:0]) is compared to the tag_address[17:12] and tag_way[1:0] read from tag array 1329 of the BTB 132. If BTB hit ("Yes" path of step S436), the process goes to step S440, where the hit way signal resulted from the comparison is used to generate the branch target address and BTB hit signal. The BTB array only provides a portion of the branch target address. The formation of full branch target address would require accessing of L2 TL B 153, and the process of which would be explained in steps S434, S450, S452, S454 below. If BTB miss ("No" path of step S436), the process goes to step S438. In step S438, the BPU, waits for the CPU 110 to execute the branch instruction and update BTB on misprediction.

In step S434, the target address (e.g., target_addr[17:12]) and target way (e.g., target_way[1:0]) are read from the indexed entry from the target address array 1320 according to the index portion of the branch instruction, where the target_addr[17:12] and the target_way[1:0] are used for translating the target_addr[17:12] into virtual page address of the branch target instruction through the L2 TLB 153. In step S450, the L2 TLB 153 is accessed by using the target_addr[17:12] and the target_way[1:0]. In the L2 TLB 153, the target_addr[17:12] is translated into the virtual page address of the branch target address by accessing the virtual address tag array 1539. The target_way[1:0] from the BTB 132 selects one of the virtual addresses (e.g., virtual_addr [31:18]) associated to the target_addr[17:12]among the 4-way associative cache array through the MUX 1544. Since two sets of the target address and target way are provided from the BTB 132 to the L2 TLB for the virtual page address translation, the L2 TLB 153 would generate one virtual page address (e.g., virtual_page_addr[31:18]) for each set of target address provided by the BTB 132. In step S454, the 12 TLB 153 provides the virtual page addresses to the BTB 132 for forming the full branch target address. That is, the process goes back to step S440.

In step S440, the BTB way hit signal from the comparison between 8-bit address (i.e., branch address provided by the control and interface 117 merged with the TLB way associative data obtained from the iTLB 151) and 8-bit data recorded in the BTB entries is used for selecting a target address (e.g., target_addr[17:12]) and a target index (e.g., target_index[11:2]) from the target address array 1320 in the BTB 132 through the MUX 1325 and the MUX 1328, respectively. The BTB way hit signal is also used to select one of the virtual page address (e.g., virtual_page_address [31:18]) obtained from L2 TLB 153 through the MUX 1325.

In step S442, the selected target_addr[17:12], the selected target_index[11:2], and the selected virtual_page_addr[31: 18] are merged by a merge logic 1327, so as to form a full branch target address (also referred to as BTB target address). The branch target address may be provided to the CPU 110 via the bus 101, where the instruction fetch unit 111 may fetch the instruction from the instruction cache 171 according to the BTB target address. In other embodiments, the BTB target address formed in the step S442 is provided to the beginning of the branch prediction steps, for example, step S402, as to start another branch prediction on the BTB target address.

In the above embodiments, the branch prediction may be performed with less bits of the branch address (i.e., tag portion of the branch address) by accessing the iTLB to obtain a TLB way associative of the TLB that is associated with the branch address, where the TLB way associative is stored in the iTLB entry as TLB way data. At the same time, the BTB is also accessed to look up at least one BTB entry that is associated with the branch address. Then, the BTB hit is determined by using the TLB way associative obtained from the iTLB. In the embodiments, the iTLB is used for fast access for the branch prediction. However, the disclosure is not intended limited thereto. In other alternative embodiments, the L2 TLB may be accessed directly to obtain the TLB way associative of a TLB entry that is associated with the branch address.

Figure 5A:
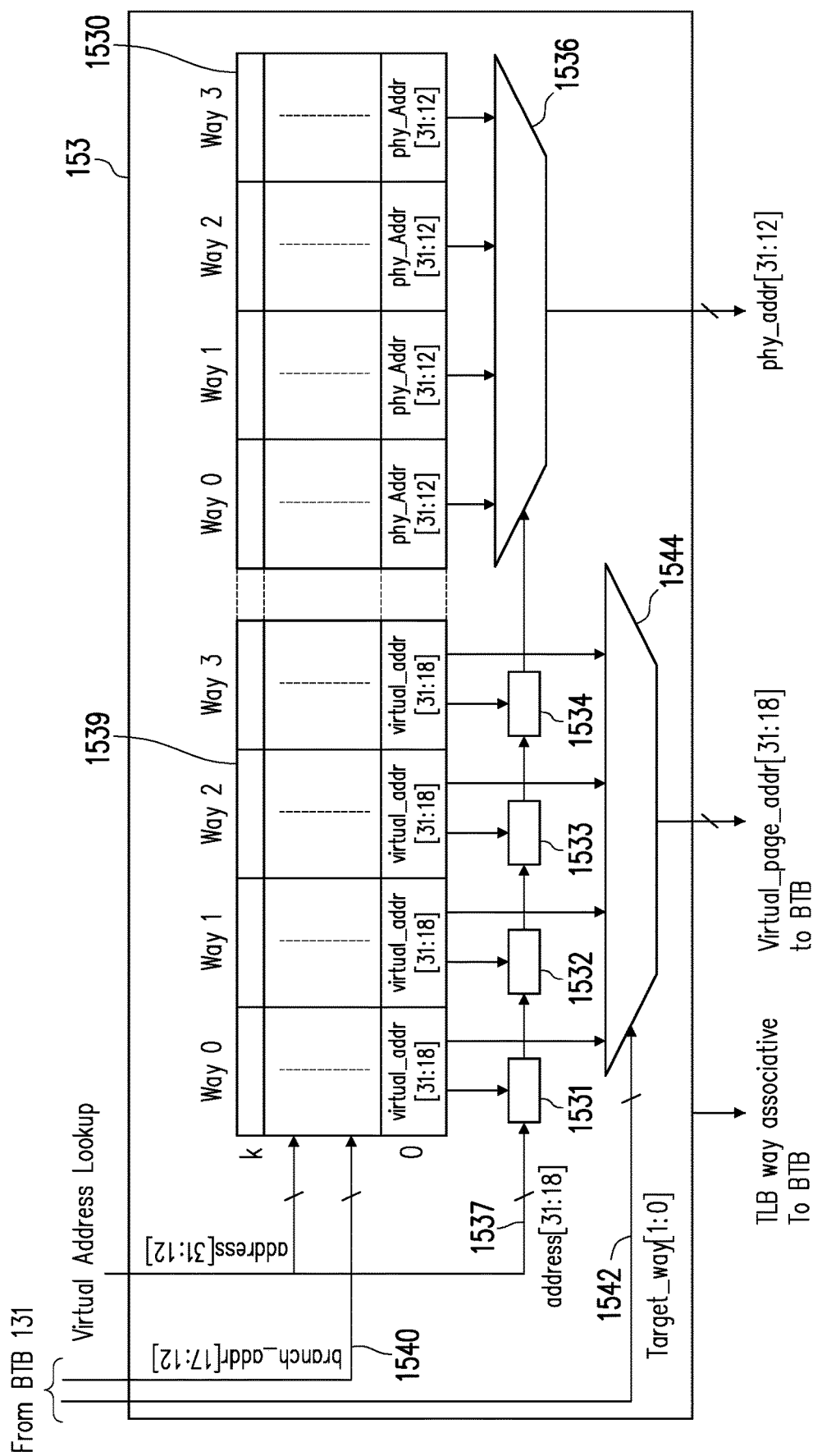
FIGS. 5A and 5B are diagrams illustrating an operation of branch prediction according to one of the embodiments of the disclosure.
Figure 5B:
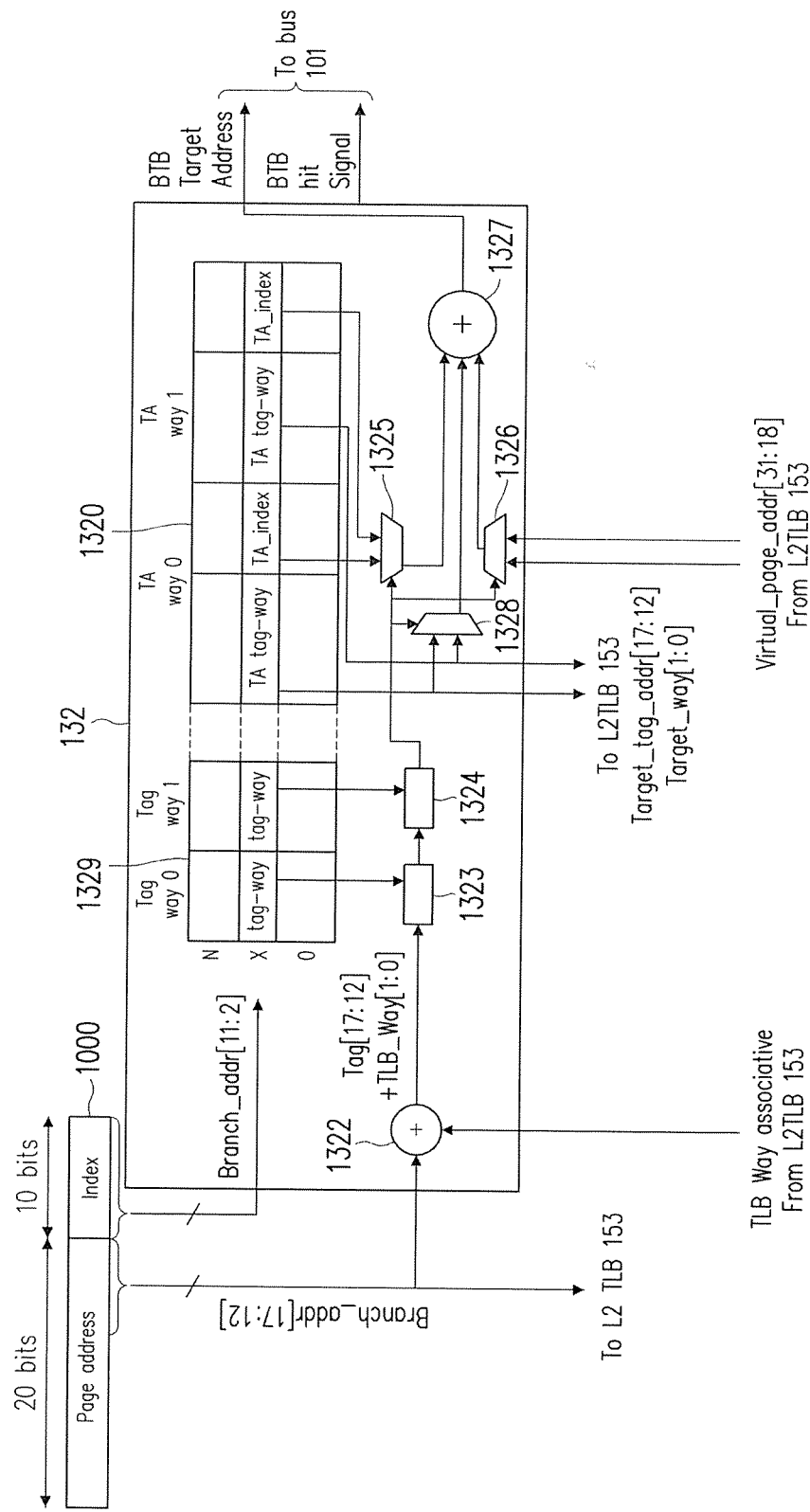
Figure 6:
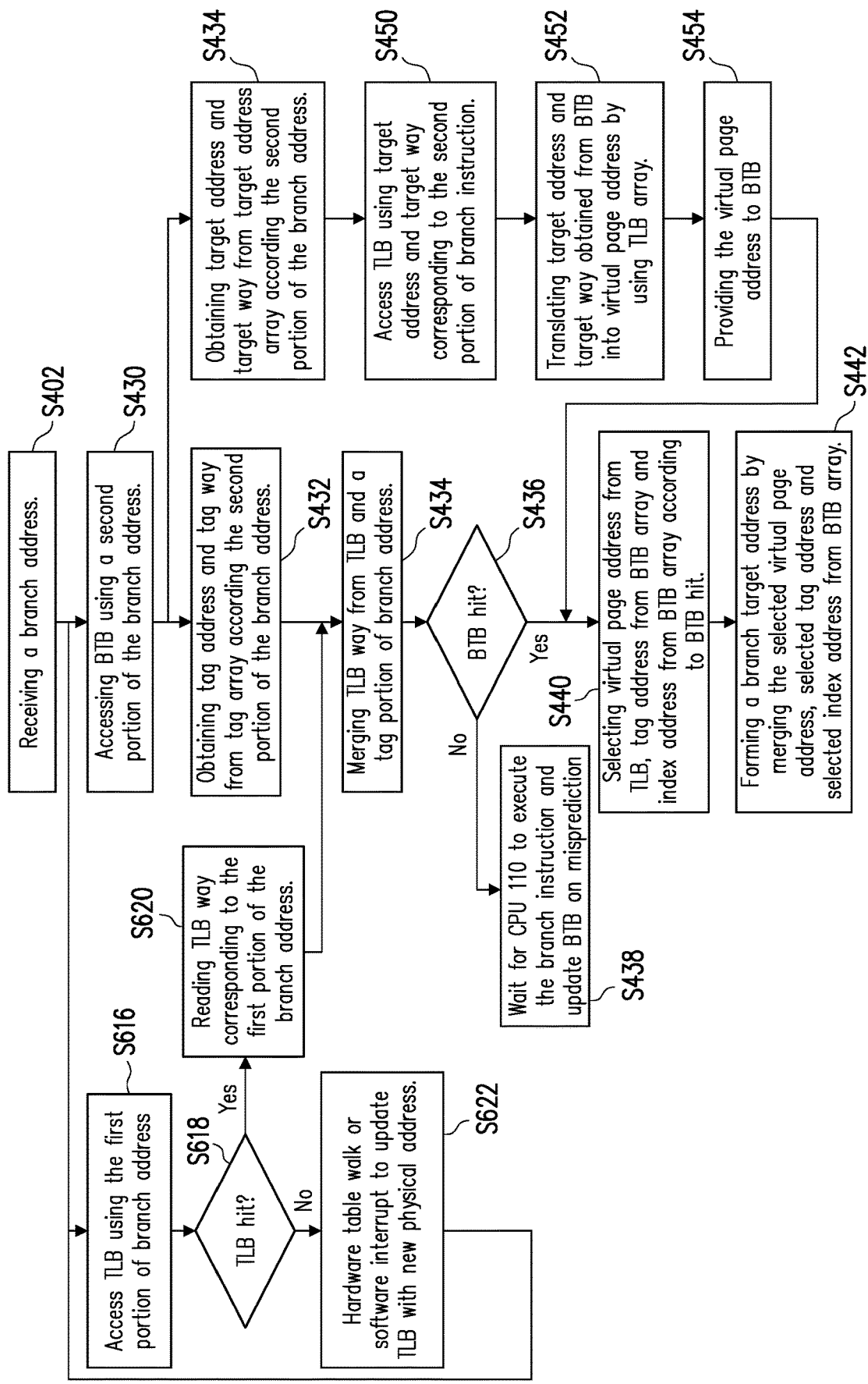
FIG. 6 is a flow diagram illustrating a process of branch prediction according to some embodiments of the disclosure.

FIGS. 5A and 5B are diagrams illustrating an operation of branch prediction according to some embodiments of the disclosure. FIG. 6 is a flow diagram illustrating a process of branch prediction of the embodiments illustrated in FIGS. 5A-5B. In the embodiments, the structure of the BTB 132 and L2 TLB 153 are the same as the embodiments illustrated in FIGS. 3A-3B, and thus the detail description thereof would be omitted from brevity. One of the differences between the embodiments is that a TLB way associative of the L2 TLB 153 that is associated with the branch address is provided to the BTB 132 from the L2 TLB 153 directly. The TLB way associative represents one of N ways of the L2 TLB 153 having the TLB entry that is associated with the branch address. In the embodiments, the branch address is provided to the L2 TLB 153 directly for a virtual address lookup. The virtual address lookup may be referred to as a virtual address to physical address translation of the instruction addresses. In the embodiments, a page portion of an address (e.g., address[31:12]) may be provided to the L2 TLB 153 for the virtual address lookup operation. The page portion of the instruction address may also be provided by the BTB 132 (e.g., branch_addr[31:12]). Alternatively, the page portion of the instruction address may be provided by the CPU 110 (inst_addr[31:12]) directly. In both embodiments, the accesses of BTB 132 and L2 TLB 153 may occur in parallel. The disclosure is not intended to limit element that provides the page portion of the instruction address.

With reference FIGS. 5A-5B and 6, the BTB 132 is indexed by the index address portion (e.g., branch_addr[11:2]) of the branch address 1000 (step S402). The L2 TLB 153 is accessed instead of the iTLB 151 of embodiments illustrated in FIGS. 3A-3B, where the page portion of the branch instruction (e.g., branch_addr[31:12]) is forwarded (or provided by the CPU 110) to the L2 TLB 153 for a virtual address lookup operation (step S616.) Based on the page portion of the branch address, the L2 TLB 153 identifies a L2 TLB entry matching the page portion of the branch address and a TLB way associative corresponding to the matched L2 TLB entry (i.e., a TLB hit). In the embodiment, the page portion of the branch address (branch_addr[31:12]) are compared to the L2 TLB entries to determine TLB hit/miss (step S618.) If TLB hit, the L2 TLB 153 provides the TLB way associative corresponding to the L2 TLB entry that is associated with the branch address to the BTB directly. That is, the TLB way associative corresponding to the branch address is provided from step S620 to S434. If TLB miss, hardware table walk or software interrupt is used to fetch the translated physical address corresponding to the branch address to update an entry in the L2 TLB 153 (step S622). Then, the process goes back to step S616. The steps S402, S430, S432, S434, S436, S438, S440, S442, S434, S450, S452, and S454 illustrated in FIG. 6 are similar to the steps illustrated FIG. 4, and thus the detail of which are omitted here for brevity.

In some embodiments, a microprocessor may not include an instruction cache (e.g., instruction cache 171 illustrated in FIG. 1), and therefore, the translation of an instruction address or branch address would require accessing the system memory 13. In such embodiment, the branch prediction utilizing the BTB would be the same. In detail, the TLB way associative may be obtained by accessing the system memory 13. In some embodiments, the TLB way associative may be referred to as a way associative of an entry included in the system memory 13.

In accordance with one of the embodiments, a microprocessor is provided with a TLB and a BTB. The TLB includes a plurality of TLB entries addressable by a branch address. The TLB is used to determine a TLB hit for at least one TLB entry among the plurality of TLB entries according to an instruction address. Each TLB entry includes a virtual address and a TLB way associative data corresponding to one of ways in L2 TLB. The BTB includes a plurality of BTB entries addressable by the branch address, each entry including a branch tag-way data and a target tag-way data. In the embodiments, the TLB way associative data of the TLB hit is used to select at least one of the BTB entries for determining whether there is a BTB hit in the BTB.

In accordance with one of the embodiments, a method of branch prediction from a branch address in a microprocessor is provided. The method includes at least the following steps: receiving the branch address, accessing a TLB to read a TLB way associative data from a TLB entry from a TLB array according to a first portion of the branch address, accessing a BTB to select at least one BTB entry from a BTB array according to a second portion of the branch address, and determining a BTB hit according to the TLB way associative data obtained from the TLB, wherein the BTB hit represents that the selected at least one BTB entry is associated with the branch address.

In accordance with one of the embodiments, a data processing system is provided. The data processing system comprising a microprocessor, a main memory coupled to the microprocessor, a bus bridge coupled to the microprocessor, and an input/output device coupled to the bus bridge. The microprocessor includes a TLB and a BTB. The TLB includes a plurality of TLB entries addressable by a branch address, and each TLB entry includes a virtual address and a TLB way associative data corresponding to one of ways in L2 TLB. The BTB includes a plurality of BTB entries addressable by the branch address, and each entry includes a branch tag-way data and a target tag-way data. In the embodiments, the TLB way associative data of the TLB is used to select at least one of the BTB entries during the branch prediction.

The foregoing has outlined features of several embodiments so that those skilled in the art may better understand the detailed description that follows. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

What is claimed is:

1. A microprocessor, comprising:
a translation look-aside buffer (TLB), including N sets of a plurality of TLB entries addressable by an instruction address including branch and non-branch addresses, each TLB entry including a virtual page address and physical address corresponding to the virtual page address, and translating a virtual page address of the instruction address to a physical address during instruction fetch, wherein N is an integer greater than 0, and determining a TLB hit for at least one TLB entry among the plurality of TLB entries according to an instruction address; and
a branch target buffer (BTB), including a plurality of BTB entries addressable by the branch address, each entry including a branch address data and a target address data corresponding to the branch address data, and determining a BTB hit for at least one BTB entry among the plurality of BTB entries according to a TLB way associative of the TLB hit, wherein the TLB way associative of the TLB represents one of the N sets of the TLB entries.

2. The microprocessor of claim 1,
wherein the TLB is addressed by using a portion of the target address data of the at least one BTB entry to translate the target address data of the at least one BTB entry to a virtual page address corresponding to a branch target address of the branch address, and
wherein the BTB generates the branch target address of the branch address by concatenating the virtual page address translated by the TLB with the target address data of the at least one BTB entry.

3. The method of claim 1, wherein the BTB concatenates a portion of branch address with the TLB way associative to form a concatenated address, and compares the concatenated address with a branch address data included in the BTB entries to determine the BTB hit on the at least one BTB entry.

4. The microprocessor of claim 1, wherein the TLB is addressed using a portion of the branch address to obtain the TLB way associative corresponding to at least one of the TLB entries.

5. The microprocessor of claim 1, wherein the BTB entries are organized in M-way set-associative, wherein M is an integer greater than 0, and wherein the at least one BTB entry having the BTB hit includes M number of BTB entries having the BTB hit.

6. The microprocessor of claim 1, wherein the TLB contains only instruction addresses.

7. The microprocessor of claim 1, wherein the TLB entries have different page sizes.

8. The microprocessor of claim 1, wherein each of the BTB entries further includes a same page bit to indicate that a virtual page address of a branch target address is the same with the branch address, wherein the virtual page address of the branch address is used for the branch target address.

9. The microprocessor of claim 1, further comprising:
an instruction TLB, including a plurality of instruction TLB entries addressable by the instruction address, each instruction TLB entry includes a virtual page address and a TLB way data corresponding to one of the N sets of the TLB,
wherein the TLB way data includes the TLB way associative of the TLB and is used to compare to at least one of the BTB entries to determine the BTB hit.

10. The microprocessor of claim 9, wherein the instruction TLB entries is organized with K way associative; wherein K is an integer greater than 0.

11. The microprocessor of claim 9, wherein, when the branch address is not in instruction TLB, the instruction TLB accesses the TLB to look up the branch address in a virtual address lookup operation, wherein a physical address and a TLB way associative of one of the TLB entries associated with the branch address is used to replace one of the instruction TLB entries.

12. The microprocessor of claim 9, wherein, when the branch address is not in instruction TLB, the instruction TLB accesses the TLB to look up the branch address in a virtual address lookup operation, wherein a TLB way associative of one of the TLB entries associated with the branch address is provided to the BTB directly for determining the BTB hit.

13. The microprocessor of claim 9, wherein, when the branch address is not in instruction TLB and the TLB, the instruction TLB accesses a system memory to look up the branch address in a virtual address lookup operation to update the TLB and the instruction TLB, and the TLB way associative of the updated TLB entry is provided to the instruction TLB or the BTB directly for determining the BTB hit.

14. A method of branch prediction from a branch address in a microprocessor, comprising:
receiving the branch address;
obtaining a TLB way associative of one of N sets of TLB entries in a TLB corresponding to the branch address, wherein N is an integer greater than 0; and
accessing a branch target buffer (BTB) to determine a BTB hit on at least one BTB entry in a BTB array according to the TLB way associative, wherein the BTB hit represents that the TLB way associative matched with the at least one BTB entry is associated with the branch address.

15. The method of claim 14, further comprising:
accessing the TLB to translate a target address data of the at least one BTB entry to a virtual page address; and
generating a branch target address of the branch address by concatenating the virtual page address translated by the TLB with the target address data of the at least one BTB entry.

16. The method of claim 14, wherein the determination of the BTB hit comprises:
concatenating a portion of branch address with the TLB way associative to form a concatenated address;
comparing the concatenated address with a branch address data included in the BTB entries to determine the BTB hit on the at least one BTB entry.

17. The method of claim 14, further comprising:
accessing the TLB using a portion of the branch address to obtain the TLB way associative corresponding to at least one of the TLB entries that is related to the branch address.

18. The method of claim 14, wherein the BTB array includes M sets of BTB entries, and the at least one BTB entry includes M number of BTB entries matched with the TLB way associative, wherein M is an integer greater than 0, further comprising:
providing a target address data of each of the M number of BTB entries to the TLB to obtain M number of virtual page addresses; and selecting one of the M number of virtual page addresses obtained from the TLB, the target address data included in one of the M number of selected BTB entries to generate the branch target address of the branch address according to the TLB way associative.

19. The method of claim 14, wherein the at least one BTB entry includes a same page bit which indicates that a page address of a branch target address is the same with a branch address, further comprising:
generating a branch target address of the branch address by using a virtual page address of the branch address as a virtual page address of the branch target address when the same page bit is set.

20. The method of claim 14, further comprising:
accessing an instruction TLB including a plurality of instruction TLB entries to translate the branch address into the TLB way associative of the TLB directed to one of N sets of TLB entries, wherein each of the instruction TLB entries includes a virtual page address and a TLB way data corresponding to the virtual page address.

21. The method of claim 20, further comprising:
accessing the TLB to lookup the branch address when no match is found among the instruction TLB entries;
reading a physical address from a matched TLB entry and a TLB way associative of the matched TLB entry in the TLB array; and
replacing one instruction TLB entry of the instruction TLB with the physical address from the matched TLB entry and the corresponding TLB way associative.

22. The method of claim 21, further comprising:
directly providing the TLB way associative of the matched TLB entry to the BTB for determining the BTB hit.

23. The method of claim 21, further comprising:
accessing a system memory to lookup the branch address when no match is found among the TLB entries; and
updating one TLB entry of the TLB with a virtual page address and a physical address corresponding to the branch address; and
providing the TLB way associative of the updated TLB entry to iTLB or the BTB.

24. A data processing system, comprising:
a microprocessor, wherein said microprocessor includes:
a translation look-aside buffer (TLB), including N sets of a plurality of TLB entries addressable by a branch address and a non-branch address, each TLB entry including a virtual address, and translating virtual page address of the branch and non-branch addresses to physical address during instruction fetch; and
a branch target buffer (BTB), including a plurality of BTB entries addressable by the branch address, each entry including a branch tag-way data and a target tag-way data,
wherein a TLB way associative of the TLB represents is one of the said N sets of the TLB and is used to compare at least one of the BTB entries;
a main memory coupled to the microprocessor;
a bus bridge coupled to the microprocessor; and
an input/output device coupled to the bus bridge.

25. The data processing system of claim 24,
wherein the target tag-way data of the BTB entries is used to select the virtual page address from one of the TLB entries as a virtual page address of the branch target address corresponding to the branch address,
wherein the BTB generates a branch target address of the branch address by concatenating the virtual page address selected in the TLB with a target tag address included in the target tag-way data and an index address in the selected BTB entry.

26. The data processing system of claim 24, wherein the branch address for addressing the TLB entries corresponds to a target tag address included in the target tag-way data of BTB.

27. The data processing system of claim 24, wherein each of the BTB entries further includes a same page bit to indicate that a page address of a target address is the same with the branch address wherein the page address of the branch address is used for target address.

28. The data processing system of claim 24, wherein the microprocessor further comprises:
an instruction TLB, including a plurality of instruction TLB entries addressable by an address, each instruction TLB entry includes a virtual page address and TLB way data corresponding to one of the N sets of the TLB,
wherein the TLB way data of each of the instruction TLB entries includes the TLB way associative of the TLB and is used to compare to at least one of the BTB entries.

29. The data processing system of claim 28, wherein, when the branch address is not in the instruction TLB, wherein the instruction TLB accesses the TLB to look up the branch address, wherein a physical address and a TLB way associative of a TLB entry associated with the branch address is used to replace one of the instruction TLB entries.

30. The data processing system of claim 28, wherein the TLB way associative of the TLB that is associated with the branch address is provided to the BTB directly as the TLB way data for selecting the at least one of the BTB entries.

* * * * *